United States Patent
Kim et al.

(10) Patent No.: US 10,343,681 B2
(45) Date of Patent: Jul. 9, 2019

(54) APPARATUS AND METHOD FOR CONTROLLING STOP OF VEHICLE

(71) Applicant: Hyundai Motor Company, Seoul (KR)

(72) Inventors: Dae Young Kim, Whasung-si (KR); Dong Gu Lee, Whasung-si (KR); Na Eun Yang, Whasung-si (KR); Hoi Won Kim, Whasung-si (KR); Hyun Jae Yoo, Whasung-si (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 15/480,042

(22) Filed: Apr. 5, 2017

(65) Prior Publication Data

US 2018/0148048 A1    May 31, 2018

(30) Foreign Application Priority Data

Nov. 25, 2016    (KR) .................... 10-2016-0158530

(51) Int. Cl.

| G08G 1/16 | (2006.01) |
| B60W 10/04 | (2006.01) |
| B60W 10/18 | (2012.01) |
| B60W 30/09 | (2012.01) |
| G01S 19/42 | (2010.01) |
| B60W 40/072 | (2012.01) |
| G01S 19/48 | (2010.01) |

(52) U.S. Cl.
CPC ............ *B60W 30/09* (2013.01); *B60W 10/04* (2013.01); *B60W 10/18* (2013.01); *B60W 40/072* (2013.01); *G08G 1/166* (2013.01); *B60W 2550/146* (2013.01); *B60W 2710/18* (2013.01); *B60W 2720/10* (2013.01); *G01S 19/42* (2013.01); *G01S 19/48* (2013.01)

(58) Field of Classification Search
CPC .... B60W 30/09; B60W 10/18; B60W 40/072; B60W 10/04; B60W 2710/18; B60W 2720/10; B60W 2550/146; G08G 1/166; G01S 19/42

See application file for complete search history.

(56) References Cited

U.S. PATENT DOCUMENTS

| 4,988,061 | A | * | 1/1991 | Miller et al. | .............. B60L 3/00 246/182 R |
| 6,337,637 | B1 | * | 1/2002 | Kubota et al. | ......... G08G 1/166 701/117 |
| 6,405,128 | B1 | * | 6/2002 | Bechtolsheim et al. | ..................... G01C 21/34 701/117 |

(Continued)

FOREIGN PATENT DOCUMENTS

| JP | 2011-057134 A | 3/2011 |
| KR | 10-2011-0055854 A | 5/2011 |

(Continued)

*Primary Examiner* — Dale W Hilgendorf
(74) *Attorney, Agent, or Firm* — Morgan, Lewis & Bockius LLP

(57) ABSTRACT

An apparatus and a method for controlling a stop of a vehicle may include an information collection system collecting at least one of road information, position information, and driving information; and a control system stopping the vehicle on a basis of the information collected by the information collection system in a case of emergency while the vehicle is running on a road.

8 Claims, 3 Drawing Sheets

(56) References Cited

U.S. PATENT DOCUMENTS

| | | | | |
|---|---|---|---|---|
| 6,459,991 | B1* | 10/2002 | Takiguchi et al. | G08G 1/166 701/24 |
| 8,296,033 | B2* | 10/2012 | Lu et al. | B60W 2720/10 701/42 |
| 2002/0177953 | A1* | 11/2002 | Okamura et al. | B60W 30/09 701/96 |
| 2005/0085985 | A1* | 4/2005 | Suzuki et al. | B60W 10/18 701/70 |
| 2007/0191997 | A1* | 8/2007 | Isaji et al. | G08G 1/166 701/1 |
| 2010/0082248 | A1* | 4/2010 | Dorum et al. | G01C 21/36 701/533 |
| 2010/0114474 | A1* | 5/2010 | Suganuma et al. | G01C 21/36 701/532 |
| 2013/0311043 | A1* | 11/2013 | Kobana et al. | B60W 10/18 701/41 |
| 2014/0207352 | A1* | 7/2014 | Rossi et al. | B60W 2720/10 701/70 |
| 2016/0171315 | A1 | 6/2016 | Yi et al. | |

FOREIGN PATENT DOCUMENTS

| KR | 10-2001-0060457 A | 6/2011 |
|---|---|---|
| KR | 10-1641490 B1 | 7/2016 |

\* cited by examiner

APPARATUS AND METHOD FOR CONTROLLING STOP OF VEHICLE

CROSS-REFERENCE TO RELATED APPLICATION

The present application claims priority to Korean Patent Application No. Korean Patent Application No. 10-2016-0158530, filed on Nov. 25, 2016, in the Korean Intellectual Property Office, the entire contents of which is incorporated herein for all purposes by this reference.

BACKGROUND OF THE INVENTION

Field of the Invention

The present invention relates to an apparatus and a method for controlling a stop of a vehicle, more particularly, to a technology for allowing a vehicle in case of emergency (drowsy driving, sudden medical emergency, loss of consciousness, or the like) while driving on a road to stop in a position that can be visually recognized by a driver of a rear vehicle.

A "rear vehicle" according to exemplary embodiments of the present invention refers to a vehicle travelling behind the subject vehicle on the same lane, but may also refer to all vehicles approaching from behind, irrespective of lanes.

Description of Related Art

A driver of a vehicle must concentrate on safety driving and keep the eyes forward while driving. However, drowsy driving due to mental and physical fatigue or sudden medical emergency such as heart attack or loss of consciousness may sometimes occur.

Such careless driving endangers the safety of passengers as well as the safety of the driver.

Recently, a driving assistance system has been developed to determine the state of a driver to secure the safety of occupants as well as the safety of the driver, and sound an alarm or automatically control the driving of a vehicle while driving carelessly.

Such a driving assistance system may determine careless driving (negligence in keeping the eyes forward, drowsy driving, or the like) of the driver by photographing the driver using a camera or analyzing the driving state of the vehicle.

A conventional driving assistance system has immediately stopped a vehicle while the driver is driving carelessly, in a case of emergency (drowsy driving, sudden medical emergency, loss of consciousness, or the like), without considering whether or not a stop position is recognizable by a driver of a rear vehicle.

In other words, the conventional driving assistance system may stop the vehicle in a position which is not recognizable by the driver of the rear vehicle, such as a curve, a position around the entrance or exit of a tunnel, or a position where an uphill road ends and a downhill road starts, thereby causing a collision with the rear vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for controlling a stop of a vehicle, allowing a vehicle in case of emergency (drowsy driving, sudden medical emergency, loss of consciousness, or the like) while driving on a road to stop in a position that can be visually recognized by a driver of a rear vehicle, thereby preventing a collision with the rear vehicle.

The objects of the present invention are not limited to the foregoing objects, and any other objects and advantages not mentioned herein will be clearly understood from the following description. The present inventive concept will be more clearly understood from exemplary embodiments of the present invention. In addition, it will be apparent that the objects and advantages of the present invention can be achieved by elements and features claimed in the claims and a combination thereof.

According to various aspects of the present invention, an apparatus for controlling a stop of a vehicle may include an information collection system collecting at least one of road information, position information, and driving information; and a control system stopping the vehicle on the basis of the information collected by the information collection system in a case of emergency while the vehicle is running on a road.

According to another aspect of the present invention, a method for controlling a stop of a vehicle may include collecting, by an information collection system, at least one of road information, position information, and driving information; and stopping, by a control system, the vehicle on the basis of the collected information in a case of emergency while the vehicle is running on a road.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
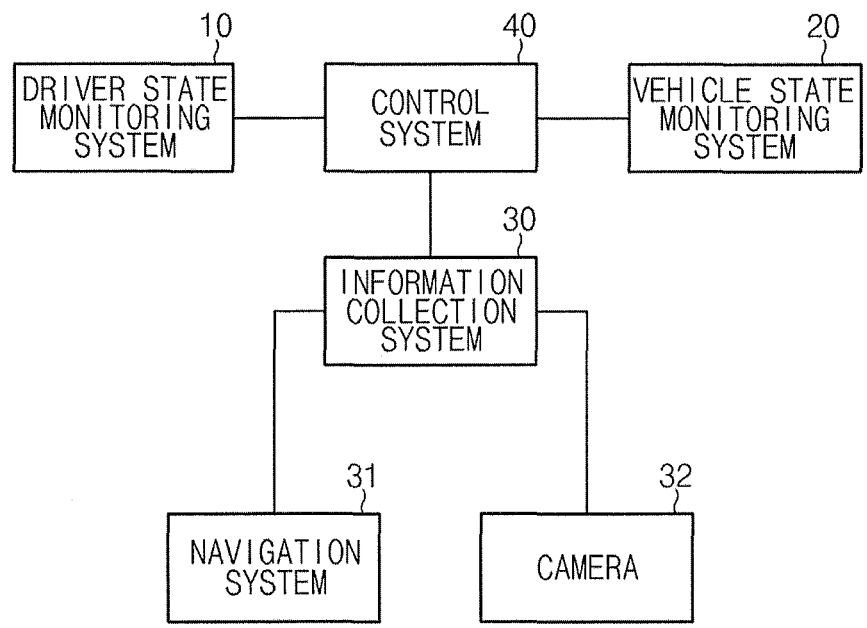
FIG. 1 illustrates a block diagram of the configuration of an apparatus for controlling a stop of a vehicle, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 illustrates a block diagram of the configuration of an apparatus for controlling a stop of a vehicle, according to an exemplary embodiment of the present invention.

As illustrated in FIG. 1, the apparatus for controlling a stop of a vehicle, according to the exemplary embodiment of the present invention, includes a driver state monitoring system 10, a vehicle state monitoring system 20, an information collection system 30, and a control system 40. Here, the control system 40 may perform the functions of individual elements, or may only perform the function of the information collection system 30.

With respect to each of the aforementioned elements, first, the driver state monitoring system 10 may monitor whether or not the driver is driving carelessly. Here, careless driving involves driving while the driver is drowsy or does not keep the eyes forward for a time period longer than or equal to a critical time due to medical emergency including heart attack or loss of consciousness.

For example, the driver state monitoring system 10 includes a camera, a recognizer, and a detector, to detect the drowsy driving of the driver.

The camera mounted on a steering wheel of a vehicle may photograph the driver to output driver image frames. Here, the number of driver image frames may be 30 frames per second, but is not limited thereto.

The recognizer may recognize a face of the driver from each of the driver image frames output from the camera using a face recognition technology to output face frames. The recognizer may output the face frames according to a face frame output cycle T. The face frame output cycle T may be one second, but is not limited thereto. Here, the face recognition technology may utilize a principal component analysis (PCA) technique.

The detector may detect at least one of a displacement velocity between the eyes of the driver and a displacement velocity between the nose and the mouth of the driver from the face frames.

The detector may determine the displacement velocity between the eyes of the driver using a distance in relation to the displacement between the eyes from the face frames output from the recognizer and the face frame output cycle T, and may determine the displacement velocity between the nose and the mouth of the driver using a distance in relation to the displacement between the nose and the mouth from the face frames and the face frame output cycle T.

In addition, the detector may detect the drowsy driving of the driver by comparing at least one of the displacement velocity between the eyes and the displacement velocity between the nose and the mouth with a predetermined phased drowsy driving detection speed. The reason for determining at least one of the displacement velocity between the eyes and the displacement velocity between the nose and the mouth is to accurately detect the drowsy driving in a situation where the driver is shaking his/her head from side to side or up and down when the driver with the eyes open is actually dozing off.

Here, the phased drowsy driving detection speed may be classified into three phases. A first-phase drowsy driving detection speed may be 0.5-3 m/s, a second-phase drowsy driving detection speed may be 4-6 m/s, and a third-phase drowsy driving detection speed may be 7-10 m/s.

Alternatively, the driver state monitoring system 10 may determine that the driver is drowsy when the size of the pupils of the driver's eyes is increased to be larger than or equal to a predetermined reference size or the number of blinking of the driver's eyes is greater than or equal to a predetermined number of times for a predetermined time period on the basis of the eye images, and may determine that the driver is not drowsy if not.

Alternatively, the driver state monitoring system 10 may detect a pupil region from the captured driver face image using Haar-like features, enhance the determination of the detected pupil region using AdaBoost learning algorithm, and determine the drowsy driving on the basis of the pupil size and original form through determination of binarization and symmetry of the detected pupil region. Here, the driver state monitoring system 10 may detect face region data using the Haarlike features before detecting pupil region data from the captured driver face image, enhance the determination of the detected face region using the AdaBoost learning algorithm, and detect the pupil region data from the detected face region data.

The vehicle state monitoring system 20 may be provided as an electronic control unit (ECU), a hybrid control unit (HCU), or the like for controlling the overall state of the vehicle. When the vehicle is unable to drive normally, the vehicle state monitoring system 20 may inform the control system 40 of this state.

The information collection system 30 may be interlocked with a navigation system 31 and a camera 32 to collect road information and position information. Here, the road information includes the curvature and elevation at a point on a road (curve), a position of a tunnel, and the direction of turn of a curve (a right-turn curve or a left-turn curve). In addition, the information collection system 30 may collect driving information provided from the navigation system.

The control system 40 controls the aforementioned respective elements to perform the functions thereof normally.

The control system 40 may check the occurrence of emergency through the driver state monitoring system 10 or the vehicle state monitoring system 20 and control the vehicle to stop in a position that is recognizable by the driver of the rear vehicle on the basis of the information collected by the information collection system 30.

Hereinafter, a process of safely stopping a vehicle by the control system 40 in a case of emergency will be detailed.

1) The control system 40 may determine whether or not a road on which the vehicle is running is a curve (hereinafter, the "first curve") having a curvature exceeding a first threshold on the basis of the information collected by the information collection system 30, and stop the vehicle safely at a safe deceleration rate (for example, 0 to −5 km/h/sec) when it is determined that the road is not the first curve. However, when it is determined that the vehicle is running on the first curve, the control system 40 may maintain a current speed of the vehicle until the vehicle is out of the first curve, and may stop the vehicle safely at a safe deceleration rate when the vehicle is out of the first curve. Here, the deceleration rate refers to a decelerated speed (km/h) for one second.

2) The control system 40 may determine whether or not a road on which the vehicle is running is a curve (hereinafter, the "second curve") having a curvature exceeding a second threshold and less than or equal to the first threshold on the basis of the information collected by the information collection system 30, and stop the vehicle safely at a safe deceleration rate (for example, 0 to −5 km/h/sec) when it is determined that the road is not the second curve.

However, when it is determined that the vehicle is running on the second curve, the control system 40 may check the direction of turn of the curve, i.e., a right-turn curve or a left-turn curve, and may determine whether a lane on which the vehicle is running is a first lane or an outermost lane. For example, when the curvature of the road is positive, the road may be determined as the left-turn curve, and when the curvature of the road is negative, the road may be determined as the right-turn curve. Here, an absolute value of the curvature may be compared with the first threshold or the second threshold.

Then, when it is determined that the road is the left-turn curve and the vehicle is running on the first lane, the control system 40 may maintain a current speed of the vehicle until the vehicle is out of the second curve, and may stop the vehicle safely at a safe deceleration rate when the vehicle is out of the second curve. Here, when it is determined that the road is the left-turn curve and the vehicle is not running on the first lane, the control system 40 may stop the vehicle safely at a safe deceleration rate.

In addition, when it is determined that the road is the right-turn curve and the vehicle is running on the outermost lane, the control system 40 may maintain a current speed of the vehicle until the vehicle is out of the second curve, and may stop the vehicle safely at a safe deceleration rate when the vehicle is out of the second curve. Here, when it is determined that the road is the right-turn curve and the vehicle is not running on the outermost lane, the control system 40 may stop the vehicle safely at a safe deceleration rate.

Figure 2:
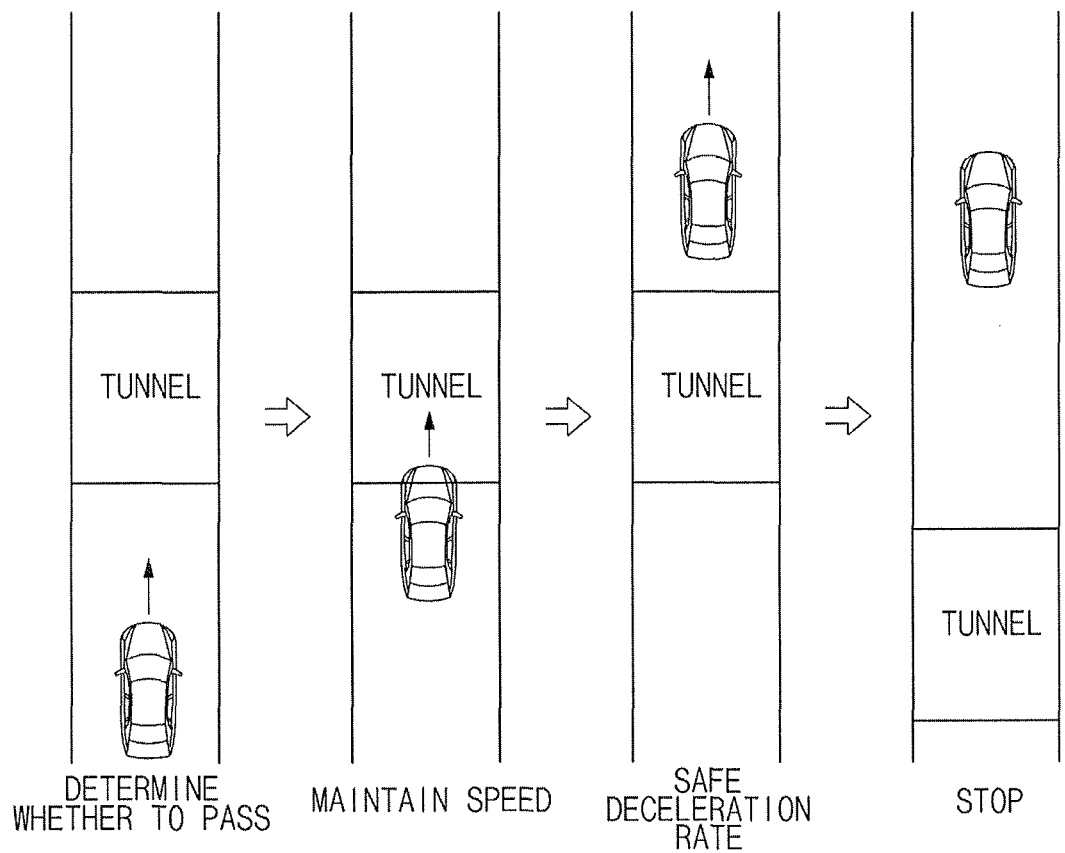
FIG. 2 illustrates a process of controlling a stop of a vehicle, according to an exemplary embodiment of the present invention.

3) As illustrated in FIG. 2, when there is a tunnel in front of the vehicle (for example, within 300 m) in a case of emergency, the control system 40 may determine whether or not the vehicle will be completely stopped before entering the tunnel when the vehicle stop is started at a safe deceleration rate, and may try to stop the vehicle at a safe deceleration rate when it is determined that the vehicle will be completely stopped.

However, when it is determined that the vehicle will not be completely stopped, the control system 40 may maintain a current speed of the vehicle until the vehicle passes through the tunnel, and may stop the vehicle safely at a safe deceleration rate when the vehicle is out of the tunnel. In this manner, the stop of a vehicle with a high risk of accident inside of the tunnel and around the entrance or exit of the tunnel may be prevented.

4) The control system 40 may determine an elevation change rate of a section in which the vehicle is currently running on the basis of information about the elevation of a point on the road among the information collected by the information collection system 30. When the determined elevation change rate exceeds a reference value, the control system 40 may maintain a current speed of the vehicle until the vehicle passes through the section, and may stop the vehicle safely at a safe deceleration rate when the vehicle is out of the section.

Figure 3:
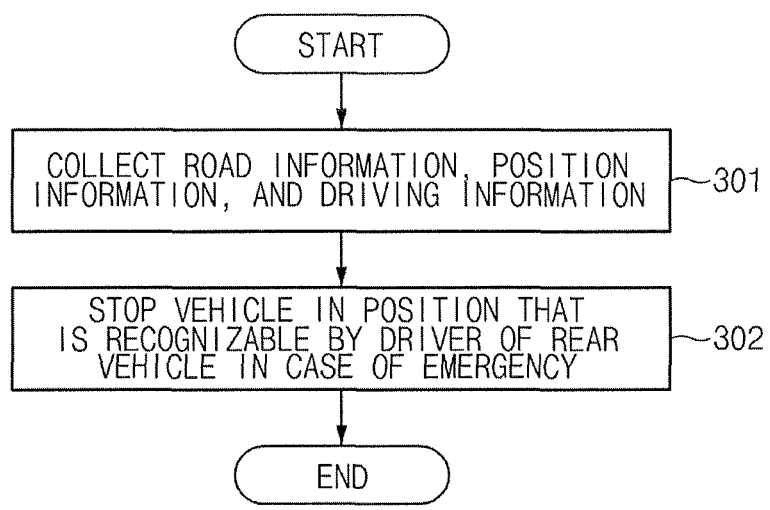
FIG. 3 illustrates a flowchart of a method for controlling a stop of a vehicle, according to an exemplary embodiment of the present invention.

FIG. 3 illustrates a flowchart of a method for controlling a stop of a vehicle, according to an exemplary embodiment of the present invention.

First of all, the information collection system 30 may collect at least one of road information, position information, and driving information from the navigation system 31 and the camera 32 in operation 301. The road information includes the curvature and elevation at a point on a road, the position of a tunnel, and the direction of turn of a curve. The position information includes GPS information. The driving information includes the speed of a vehicle.

Next, in a case of emergency while a vehicle is driving, the control system 40 may stop the subject vehicle in a position that is recognizable by a driver of a rear vehicle on the basis of the information collected by the information collection system 30 in operation 302. Here, the control system 40 may determine whether or not the emergency has occurred, using the driver state monitoring system 10 or the vehicle state monitoring system 20.

Meanwhile, the above-stated method according to the exemplary embodiment of the present invention may be written as a computer program. Codes and code segments constituting the program may easily be inferred by a computer programmer skilled in the art. The written program may be stored in a computer-readable recording medium (an information storage medium) and be read and executed by a computer, thereby implementing the method according to the exemplary embodiment of the present invention. The recording medium includes all types of computer-readable recording media.

As set forth above, the apparatus and the method for controlling a stop of a vehicle, according to the exemplary embodiments, may allow the vehicle in a case of emergency (drowsy driving, sudden medical emergency, loss of consciousness, or the like) while driving on a road to stop in a position that can be visually recognized by a driver of a rear vehicle, thereby preventing a collision with the rear vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling a stop of a vehicle, the apparatus comprising:
    an information collection system collecting at least one information of road information, position information, and driving information; and
    a control system stopping the vehicle at a predetermined deceleration rate on a basis of the at least one information collected by the information collection system in a case of emergency while the vehicle is running on a road,
    wherein the control system is configured to determine the road on which the vehicle is running as a first curve when a curvature of the road exceeds a first threshold, maintains a current speed of the vehicle until the vehicle is out of the first curve, and stops the vehicle at a predetermined deceleration rate.

2. The apparatus according to claim 1, wherein the control system is configured to determine the road on which the vehicle is running as a second curve when the curvature of the road exceeds a second threshold and is less than or equal to the first threshold, checks a direction of turn of the second curve and a lane on which the vehicle is miming, maintains the current speed of the vehicle until the vehicle is out of the second curve when the second curve is a left-turn curve and the vehicle is running on a first lane or when the second curve is a right-turn curve and the vehicle is running on an outermost lane, and stops the vehicle at the predetermined deceleration rate.

3. The apparatus according to claim 1, wherein the control system is configured to prevent the vehicle from stopping inside of a tunnel and within a distance less than or equal to a threshold from an exit of the tunnel when there is the tunnel in a front of the vehicle.

4. The apparatus according to claim 1, wherein the control system is configured to determine an elevation change rate of a section in which the vehicle is currently running on a basis of information about an elevation, maintains the current speed of the vehicle until the vehicle passes through the section when the determined elevation change rate exceeds a predetermined value, and stops the vehicle at the predetermined deceleration rate.

5. A method for controlling a stop of a vehicle, the method comprising:
   collecting, by an information collection system, at least one information of road information, position information, and driving information; and
   stopping, by a control system, the vehicle at a predetermined deceleration rate on a basis of the collected at least one information in a case of emergency while the vehicle is running on a road,
   wherein the stopping of the vehicle comprises determining the road on which the vehicle is running as a first curve when a curvature of the road exceeds a first threshold, maintaining a current speed of the vehicle until the vehicle is out of the first curve, and stopping the vehicle at a predetermined deceleration rate.

6. The method according to claim 5, wherein the stopping of the vehicle comprises determining the road on which the vehicle is running as a second curve when the curvature of the road exceeds a second threshold and is less than or equal to the first threshold, checking a direction of turn of the second curve and a lane on which the vehicle is running, maintaining the current speed of the vehicle until the vehicle is out of the second curve when the second curve is a left-turn curve and the vehicle is running on a first lane or when the second curve is a right-turn curve and the vehicle is running on an outermost lane, and stopping the vehicle at the predetermined deceleration rate.

7. The method according to claim 5, wherein the stopping of the vehicle comprises preventing the vehicle from stopping inside of a tunnel and within a distance less than or equal to a threshold from an exit of the tunnel when there is the tunnel in a front of the vehicle.

8. The method according to claim 5, wherein the stopping of the vehicle includes determining an elevation change rate of a section in which the vehicle is currently running on a basis of information about an elevation, maintaining the current speed of the vehicle until the vehicle passes through the section when the determined elevation change rate exceeds a predetermined value, and stopping the vehicle at the predetermined deceleration rate.

\* \* \* \* \*